March 31, 1936.  G. M. BARNES  2,035,450
PISTON
Filed Nov. 19, 1934
Fig.-1-
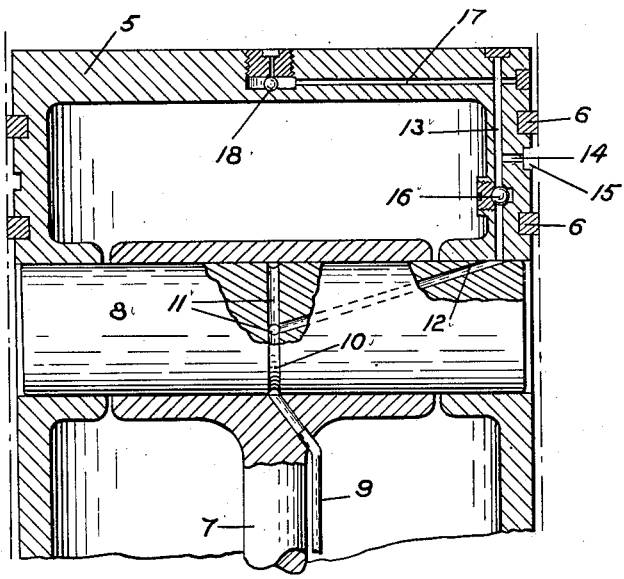
Fig.-2-
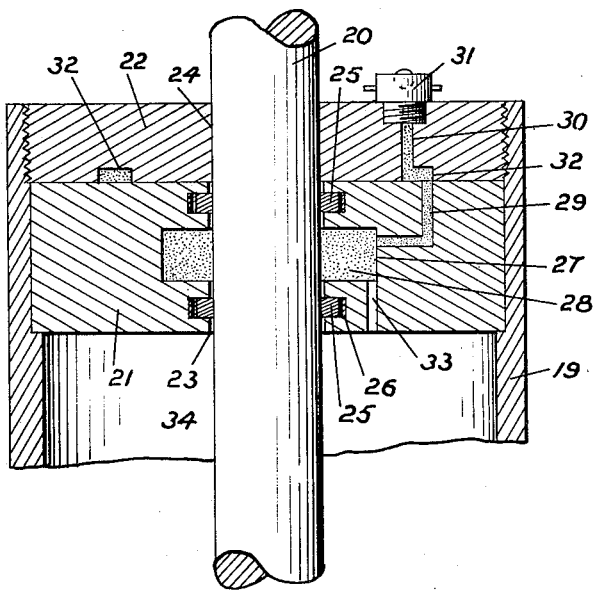
Inventor
Gladeon M. Barnes
By W. N. Roach
Attorney Patented Mar. 31, 1936

2,035,450

UNITED STATES PATENT OFFICE 2,035,450

PISTON

Gladeon M. Barnes, United States Army, Hastings, Mich.

Application November 19, 1934, Serial No. 753,650

1 Claim. (Cl. 184—18)

(Granted under the act of March 3, 1883, as amended April 30, 1928; 370 O. G. 757)

The invention decided herein may be manufactured and used by or for the Government for governmental purposes, without the payment to me of any royalty thereon.

This invention relates to a piston and more particularly it has reference to means for providing a seal between the piston and its cylinder.

The purpose of the invention is to provide a piston seal which is not only gas tight but which improves lubrication and thereby prevents wear of the parts. The sealing material is placed under pressure by the pressure medium which acts on the piston or is acted on by the piston.

To these and other ends, the invention consists in the construction, arrangement and combination of elements described hereinafter and pointed out in the claim forming a part of this specification.

Several practical embodiments of the invention are illustrated in the accompanying drawing, wherein:

Fig. 1 is a longitudinal sectional view of a piston and cylinder provided with the improved seal.

Fig. 2 is a similar view of a different application of the invention.

Referring to Fig. 1 there is shown a typical piston comprising a head 5 having spaced packing rings 6—6, a rod 7 connected to the head by a wrist pin 8, and a pipe 9 for conducting lubricant under pressure to a peripheral groove 10 in the wrist pin.

The wrist pin is modified by providing radial passages 11—11 from the groove 10 and an inclined passage 12 leading from passages 11 to a passage 13 in the head 5. A passage 14 leads from the passage 13 to a peripheral groove 15 positioned between the packing rings 6—6. A ball valve 16 is placed in the passage 13 between the passage 14 and the wrist pin and prevents return of the lubricant after it has been forced past the valve.

The passage 13 is joined to a passage 17 which is in communication with the front pressure face of the piston head. A ball valve 18 is placed in the passage 17.

The lubricant which is conducted to the space between the packing rings 6—6 is acted on by a high pressure medium admitted through the valved passage 17 and forms a gas-tight seal between the piston head and its cylinder. As the pressure medium is trapped, the lubricant remains under pressure a considerable length of time, and in the case of a gas engine an effective seal is maintained during the exhaust, intake and compression strokes of the piston. This pressure is renewed each time an explosion occurs in the cylinder.

In Fig. 2 the invention is illustrated as applied to the packing of a cylinder 19 which moves with respect to a fixed rod 20. One end of the cylinder is closed by a head 21 which is retained by a disc 22 threadedly attached to the cylinder. The head and disc are formed with apertures, respectively 23 and 24, to accommodate the rod 20.

The head 21 carries a pair of spaced packing rings 25—25 which are held against the rod 20 by springs 26. The head is formed with an annular groove 27 between the packing rings and this groove is filled with a heavy grease 28 which is admitted through a passage 29 in the head and a passage 30 in the disc, the latter being associated with a fitting 31 secured in the disc. The inner face of the disc is formed with an annular groove 32 which is in communication with the passage 30 and is also filled with the grease 28.

The head is provided with a passage 33 leading from its pressure side to the annular groove 27. A pressure medium from the chamber 34 is therefore capable of acting on the grease which forms an effective seal.

I claim:

A piston including a head, a wrist pin in the head, a rod connected to the wrist pin, a line for conducting lubricant to the wrist pin, spaced packing rings carried by the head, passages in the wrist pin and head for conducting lubricant to the side face of the head between the packing rings, a one-way valve in one of said passages, a passage leading from the pressure face of the head to said preceding passage and a one-way valve in said passage.

GLADEON M. BARNES.